United States Patent [19]

Ray, Jr.

[11] 4,397,898
[45] Aug. 9, 1983

[54] THICK BATT OF FIBROUS INSULATION

[75] Inventor: Richard J. Ray, Jr., Littleton, Colo.

[73] Assignee: Manville Service Corporation, Denver, Colo.

[21] Appl. No.: 365,227

[22] Filed: Apr. 5, 1982

Related U.S. Application Data

[62] Division of Ser. No. 198,411, Oct. 20, 1980, Pat. No. 4,342,610.

[51] Int. Cl.³ .............................................. B32B 12/06
[52] U.S. Cl. ...................................... 428/43; 428/121; 428/130
[58] Field of Search ............... 428/136, 121, 124, 130, 428/43.192; 156/62.6, 200, 204, 211, 227, 264, 257; 493/230, 353, 233, 238; 83/678, 695, 862, 322

[56] References Cited

U.S. PATENT DOCUMENTS

| | | | |
|---|---|---|---|
| 1,967,444 | 7/1934 | Lowe | 428/43 |
| 2,681,702 | 6/1954 | Kuenn et al. | 65/11 |
| 3,166,456 | 1/1965 | White et al. | 156/20 X |
| 3,235,432 | 2/1966 | George | 156/201 |
| 3,615,964 | 10/1971 | Malone | 156/62.6 |
| 3,652,377 | 3/1972 | Helmick | 156/62.2 |
| 4,196,034 | 4/1980 | Kimura | 156/211 |

FOREIGN PATENT DOCUMENTS 958633 12/1974 Canada .................................. 428/43

Primary Examiner—Michael W. Ball
Attorney, Agent, or Firm—Ronald M. Halvorsen; John D. Lister; Richard K. Thomson

[57] ABSTRACT

The present invention relates to a method and apparatus for the production of fibrous insulation, especially relatively thick fibrous insulation. Previously some relatively thick insulation has been produced through lamination techniques using a plurality of insulation layers, which possibly included the use of a continuous fibrous hinge as an alignment aid during lamination. However, proper alignment using a continuous hinge is difficult and leaves an objectionable bulge of fibrous material. The present invention eliminates the fibrous bulge of the prior art and provides a more accurate means by which to substantially accurately align the layers of fibrous insulation. A fibrous blanket of insulation is slit by means of a notched cutting blade to provide a plurality of fibrous hinges or fibrous pillars connecting a plurality of fibrous batts whereby upon the application of an adhesive to one or more of the fibrous batts, another of the batts may be folded about the hinges onto the adhesive covered batt and laminated to form the relatively thick insulation product.

1 Claim, 3 Drawing Figures

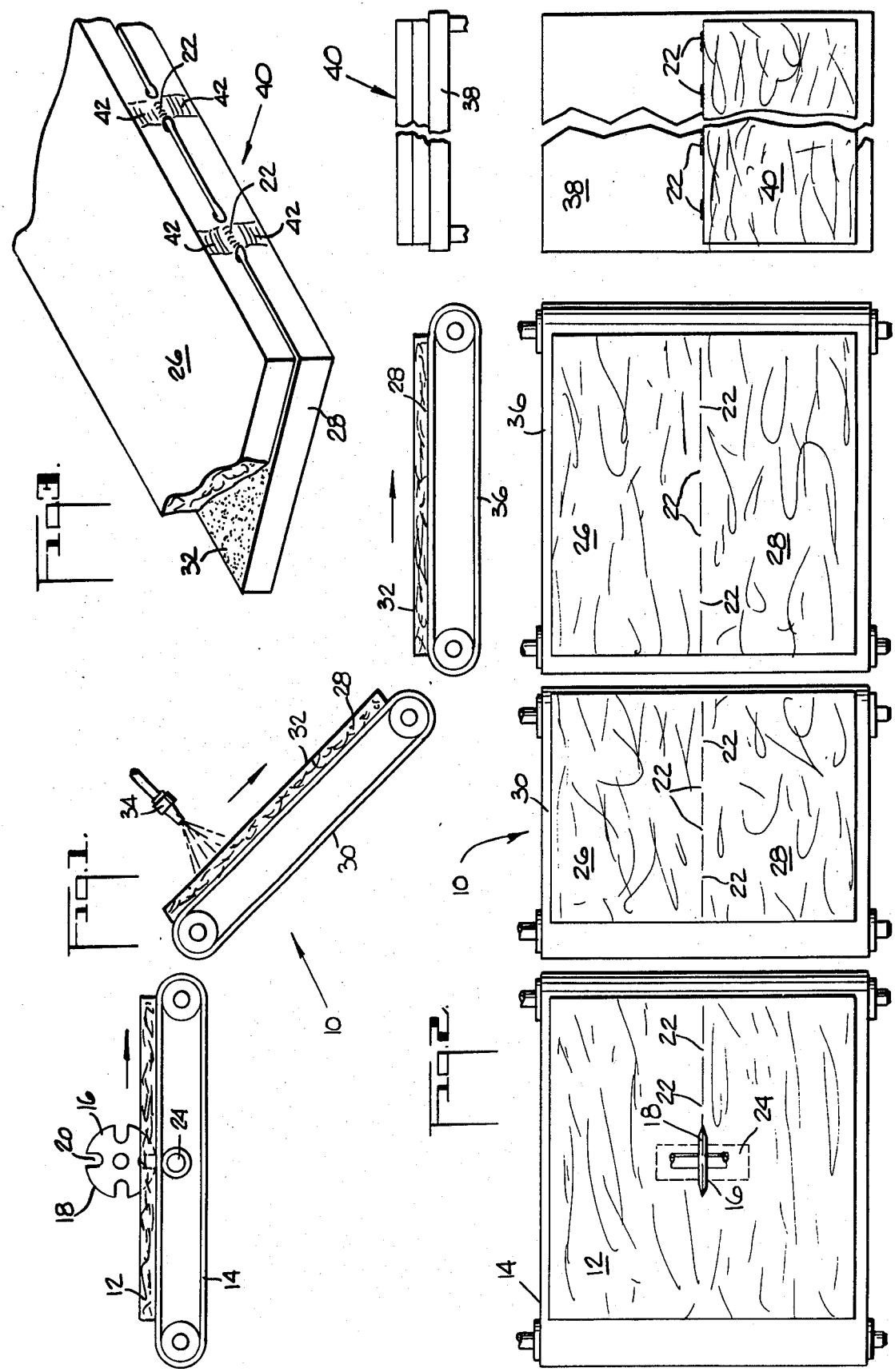

THICK BATT OF FIBROUS INSULATION

This is a Division of application Ser. No. 06/198,411, filed Oct. 20, 1980, now U.S. Pat. No. 4,342,610.

TECHNICAL FIELD

The present invention is directed to a method and apparatus for the production of fibrous insulation and more particularly is related to a method and apparatus for the production of relatively thick fibrous insulation batts through the lamination of two relatively thin insulation batts.

BACKGROUND OF PRIOR ART

Recently, due to urgent needs for energy conservation, there has been an increasing need for insulation of greater thickness which generally provides a greater insulating value or an R value, e.g., R values on the order of R-38 or more. It has been a common practice to laminate or glue together two relatively thin insulation batts in order to form a relatively thick insulating batt. However, lamination of insulating batts is somewhat cumbersome because of problems associated with ensuring a complete alignment of the exterior edges of the individual batts forming the final relatively thick insulation batt.

More recently, a manufacturer of insulating material has taken an insulating blanket and has partially cut through the insulating material in order to form a continuous fibrous hinge between the formed insulating batts. Proximate the terminal portion of the insulation production line, a worker uses the hinge to help in aligning the two insulating batts to be joined. Unfortunately, because of the nature of fibrous insulations, this continuous hinge is unsatisfactorily unwieldly and does not allow for a substantially perfect alignment of the exterior edges of the insulation batts. Furthermore, the final laminated batt or product has an objectionable bulge on the side of the laminated batt where the original continuous fibrous hinge was formed.

In another process of the manufacture of fibrous insulation, an insulation blanket is slitted along the machine direction into a plurality of insulation batts separated by a plurality of fibrous pillars. Notched slitter blades are used to form the discontinuous slits between the batts in order to insure that the batts are aligned as they are conveyed towards the packaging area of the fibrous insulation manufacturing line. If the batts were completely separated, they could become misaligned making packaging difficult. However, the relatively thin batts in this process have never been laminated to form a relatively thick insulation product.

BRIEF SUMMARY OF THE INVENTION

Accordingly, the present invention provides a method and apparatus forming a laminated relatively thick insulation product in which a cured insulation blanket is conducted past a notched slitter blade which is disposed, e.g., in the middle of the blanket, in order to form a series of fibrous pillars or hinges along the length of the insulation blanket. The series of fibrous hinges are formed by at least one slitter blade having a series of substantially non-cutting notches removed from its exterior cutting surface. The material of the insulation blanket will therefore not be cut at the portion of the slitter blade where the notches are formed whereby in use a series of discrete fibrous hinges are formed. In a section downstream of the slitter blade an adhesive material may be applied to one or more surfaces of the individual insulation batts formed by the slitter blade. The adhesive material may be a water based or a hot melt adhesive. Downstream of the adhesive applying section a worker rotates or flips one insulation batt onto the other using the discrete fibrous hinges as an alignment guide means in order to form the final laminated relatively thick insulation product of the present invention.

BRIEF DESCRIPTION OF THE DRAWINGS

FIG. 1 is a schematic side view illustrating the process steps and apparatus of the present invention.

FIG. 2 is a schematic plan view of the present invention.

FIG. 3 illustrates the final laminated relatively thick insulation product of the present invention.

DESCRIPTION OF THE PREFERRED EMBODIMENT

FIG. 1 is a side view schematically illustrating a production line 10 utilizing the method and apparatus of the present invention. The method and apparatus of the present invention are primarily intended for use in a fiber glass manufacturing operation wherein mats, batts or blankets of insulating material are produced. However, the method and apparatus of the present invention can be used in any manufacturing operation wherein flexible products in strip, ribbon, mat or blanket form are being manufactured in a relatively thick configuration.

FIG. 1 illustrates a cured blanket 12 of insulating material coming from a conventional felting operation or other source (not shown) wherein glass fibers or other filaments are felted into a blanket. The blanket 12 is carried by a conveyor 14 to a slitter blade 16 rotatable about an axis and modified in order to perform the process steps and form the product of the present invention. As can be seen from FIG. 1, the slitter blade 16 is of fairly conventional design wherein a slitting or a cutting surface 18 is defined on the entire periphery or circumference of the blade 16. A plurality of substantially non-cutting notches 20 are provided at convenient locations about the periphery of the blade. These notches 20 do not substantially cut the blanket 12 and therefore form a plurality of fibrous pillars or hinges 22 along the length of the blanket 12. The width of each notch 20 is selected to ensure that the width of the fibrous hinge 22 produced is not too large, as will be better explained hereinafter. The slitter blade 16 cooperates with an anvil roll 24 in order to perform the cutting function and subdivide the blanket 12 into two equally sized insulation batts 26 and 28.

The insulation batts 26 and 28 are joined merely by the discrete fibrous hinges 22 and are conveyed to a conveyor 30 where an adhesive material such as a water based adhesive or a hot melt adhesive is applied (fully or partially) to the upper surfaces of either the batt 26 and/or the batt 28. For purposes of illustration only, an adhesive 32 is shown being applied by means of a spray nozzle 34 (see FIG. 1). If a hot melt adhesive is used, it may be conveniently foamed.

After the adhesive material 32 is applied to either the batt 26 and/or the batt 28 the partially joined batts are conveyed to a conveyor 36 which transports the batts to a work table 38 where a worker grabs either the batt 26 or the batt 28 and rotates or flips the selected batt onto the other batt using the fibrous hinges 22 as a guide or an alignment aid. By means of this manual operation a final relatively thick laminated product 40 is formed as shown in the right hand portion of FIGS. 1, 2 and in FIG. 3

Note that as a result of, e.g., batt 26 being flipped or folded over onto batt 28, the fibers of the original fibrous pillars or hinges 22 tear as at 42 allowing alignment of the batts to readily take place. A unique feature of the fibrous hinges 22 is that they work either way, i.e., rotation of one batt versus another may take place either in a clockwise or counter-clockwise direction. This is due to the fact that the non-cutting notches 20 do not cut the fibrous blanket and because the hinges 22 are relatively narrow. If the notches 20 cut too deeply into the material at 22, the hinges will break too readily thereby greatly increasing the liklihood of misalignment of the batts 26, 28 as they are being folded and laminated together. If the hinges are too wide, the tears at 42 may not take place. If the tears 42 do not occur, the insulation may be objectionably crimped or compressed at the location of the hinges 22 because of the strength of the fibers. As an illustration, at least a $\frac{1}{4}$ inch deep, $\frac{3}{4}$ inch wide notch should be used for fibrous insulation 5 inches to $7\frac{1}{2}$ inches thick. With this configuration, the fibrous insulation will merely be crushed within the notches and not cut.

By this method and apparatus, a laminated relatively thick product 40 may be formed whose exterior edges are substantially aligned and which does not have an objectionable continuous hinge along one surface (due to the small number of narrow hinges 22). The number of discrete fibrous hinges 22 which are formed in the original cured insulation blanket is dependent upon the length of the blanket and upon choice.

Furthermore, while the process has been described as an inline process, the process step of laminating the two insulation batts may be done off the production line. Also, while a generally continuous type of slitter described in the present invention may be used, it is quite possible that a reciprocating type of cutter may be used in order to form discontinuous cuts thereby forming the discrete fibrous pillars or hinges 22. Lastly, while the flipping of the batts has been disclosed as a manual operation, it is clear that this operation may be performed by a suitable mechanism.

While the slitter blade 16 has been shown as being disposed above the anvil roll 24, it is quite possible to position the slitter blade on the bottom and generate the fibrous hinges in the insulation blanket 12. Again, this is due to the fact that the non-cutting notches 20 do not cut the fibrous blanket.

It is also possible to use a plurality of slitter blades 16 in order to form a plurality of batts which may be rotated, counter rotated or flip-flopped one onto the other to form a multiple layer laminated relatively thick blanket. In this way the original blanket would be slit thereby forming an accordian-like insulating material. The worker at the end of the production line would simply alternately flip and then flop one batt onto another. It is clear therefore, that the present method and apparatus can provide for extremely thick insulation.

The present invention and apparatus does not produce an objectionable bulge of material or a hinge because most of the fibers at the discrete fibrous hinges or pillars actually separate and pull apart, leaving only a small portion of the heights of the pillar intact when the batts are folded over (The direction of rotation is unimportant, as explained earlier). The size and number of pillars can be varied to suit the requirements of the product and the production line.

What is claimed is:
1. A thick batt of fibrous material manufactured by the process of
    (a) cutting a blanket of fibrous material into a plurality of individual pieces;
    (b) intermittently slitting each piece completely through the blanket to form two portions which are interconnected by discrete pillars of fibrous material;
    (c) applying an adhesive to at least one of said interconnected fibrous portions;
    (d) folding one of said interconnected fibrous portions onto the other of said fibrous portions, at least the innermost fibers in the folded pillars being uncut and functioning as a hinge to insure proper alignment of the two portions, each of said plurality of pillars being sufficiently narrow as to enable the outermost fibers in the folded pillars to tear so as not to crimp the thusly formed thick batt.
* * * * *